(12) United States Patent
Curtis

(10) Patent No.: US 9,121,460 B2
(45) Date of Patent: Sep. 1, 2015

(54) TRANSMISSION CONTROL FLUID DIFFUSER

(75) Inventor: Tami A. Curtis, South Lyon, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 423 days.

(21) Appl. No.: 13/595,231

(22) Filed: Aug. 27, 2012

(65) Prior Publication Data

US 2013/0247552 A1 Sep. 26, 2013

Related U.S. Application Data

(60) Provisional application No. 61/614,873, filed on Mar. 23, 2012.

(51) Int. Cl.
*F16D 48/02* (2006.01)
*F16H 61/00* (2006.01)

(52) U.S. Cl.
CPC ............ *F16D 48/02* (2013.01); *F16H 61/0021* (2013.01); *F16D 2048/0224* (2013.01); *F16H 2061/0037* (2013.01); *Y10T 137/86187* (2015.04)

(58) Field of Classification Search
CPC ............ F16D 48/02; F16D 2048/0224; F16H 61/0021; F16H 2061/0037
USPC .......................................................... 60/341
See application file for complete search history.

(56) References Cited

U.S. PATENT DOCUMENTS

| | | | |
|---|---|---|---|
| 3,897,167 A * | 7/1975 | Fauconnet ...................... 60/330 |
| 5,005,356 A * | 4/1991 | Saunders ........................ 60/330 |
| 5,490,760 A * | 2/1996 | Kotzur ............................ 415/68 |
| 6,783,334 B2 * | 8/2004 | Sanderson et al. .............. 60/453 |
| 2006/0032808 A1 | 2/2006 | Hauge |
| 2008/0035443 A1 | 2/2008 | De Maziere et al. |
| 2008/0308355 A1 * | 12/2008 | Kakinami et al. ........... 184/27.2 |
| 2009/0232673 A1 | 9/2009 | Reisch et al. |
| 2011/0120250 A1 | 5/2011 | Kirchner |
| 2011/0272239 A1 * | 11/2011 | Yoshikawa et al. ........ 192/113.3 |
| 2012/0085441 A1 * | 4/2012 | Park et al. ................ 137/565.11 |

* cited by examiner

*Primary Examiner* — Thomas E Lazo
(74) *Attorney, Agent, or Firm* — Quinn Law Group, PLLC

(57) ABSTRACT

A transmission includes a high-pressure circuit at least partially filled with transmission fluid at a first pressure, and a low-pressure circuit at least partially filled with transmission fluid at a second pressure, which is lower than the first pressure. A diffuser is in fluid communication with the high-pressure circuit and the low-pressure circuit. The diffuser has an inlet having a first cross-sectional area and receiving transmission fluid from the high-pressure circuit. The diffuser expels transmission fluid to the low-pressure circuit through an outlet having a second cross-sectional area, which is larger than the first cross-sectional area.

17 Claims, 2 Drawing Sheets

TRANSMISSION CONTROL FLUID DIFFUSER

CROSS-REFERENCE TO RELATED APPLICATIONS

This application claims the benefit of U.S. Provisional Patent Application No. 61/614,873, filed on Mar. 23, 2012, the disclosure of which is hereby incorporated by reference.

TECHNICAL FIELD

This disclosure relates to management of transmission fluids in hybrid and conventional transmissions.

BACKGROUND

Automobiles and other vehicles utilize fluid-filled transmissions to convert power and torque from primary movers into output power and torque. Portions of the fluid-filled transmissions may be pressurized by one or more pumps.

SUMMARY

A transmission is provided. The transmission includes a high-pressure circuit at least partially filled with transmission fluid at a first pressure, and a low-pressure circuit at least partially filled with transmission fluid at a second pressure. The second pressure is lower than the first pressure. The transmission also includes a diffuser in fluid communication with the high-pressure circuit and the low-pressure circuit.

The diffuser has an inlet having a first cross-sectional area and receiving transmission fluid from the high-pressure circuit. The diffuser also has an outlet having a second cross-sectional area, and expelling transmission fluid to the low-pressure circuit. The second cross-sectional area of the diffuser is larger than the first cross-sectional area.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
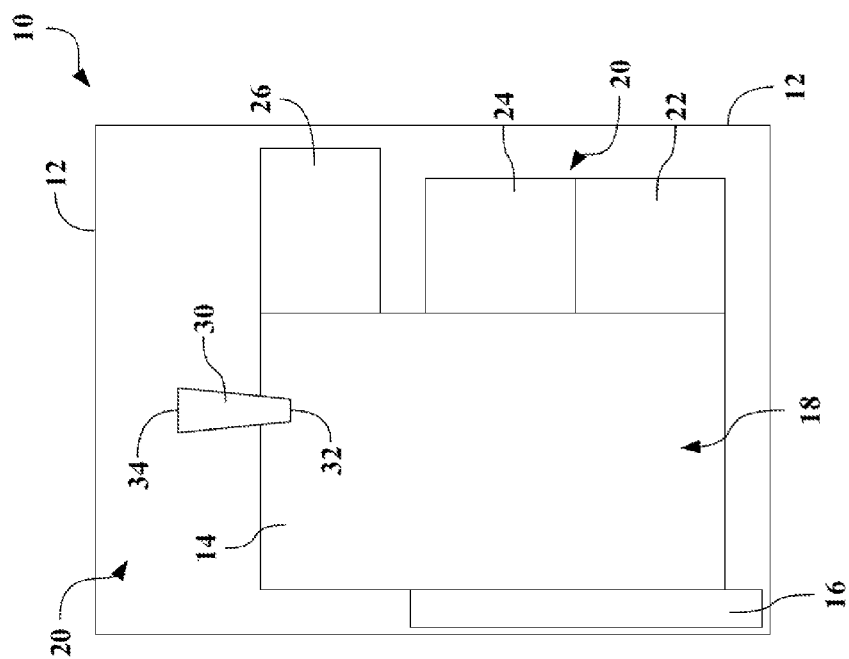
FIG. 1 is a schematic diagram of a hybrid transmission.

Referring to the drawings, wherein like reference numbers correspond to like or similar components wherever possible throughout the several figures, there is shown in FIG. 1 a transmission 10, which may be used with various vehicles (not shown). The transmission 10 is shown as a highly-schematic diagram and represents many different configurations of conventional and hybrid transmissions used in vehicles.

While the present invention may be described with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

The transmission 10 includes a transmission case 12 that generally surrounds and encloses other components of the transmission 10. A valve body assembly 14 receives and distributes pressurized fluid from a pump 16.

The pump 16 may be an electrical pump or a mechanical pump driven directly or indirectly by one or more primary movers (not shown) of the transmission 10. The pump 16 may also be a torque converter. The working fluid may be automatic transmission fluid or oil, or may be any other suitable working fluid.

A high-pressure region or high-pressure circuit 18 is filled with transmission fluid at a first pressure, which is an elevated pressure from the pump 16. The high-pressure circuit 18 generally encompasses the valve body assembly 14 and may, therefore, have multiple elevated pressures depending upon the configuration of the valve body assembly 14.

A low-pressure circuit 20 is at least partially filled with transmission fluid at a second pressure, which is lower than the first pressure. The low-pressure circuit is un-pumped and may be at or near ambient pressure.

The transmission 10 further includes a first clutch 22, which is a fluid-actuated clutch, and a second clutch 24, which is also a fluid-actuated clutch. The valve body assembly 14 is in fluid communication with the first clutch 22 and the second clutch 24, and is configured to selectively actuate both the first clutch 22 and the second clutch 24. The transmission 10 also includes an electric machine 26, such that the transmission 10 may be referred to as a hybrid transmission 10.

A diffuser 30 is in fluid communication with the high-pressure circuit 18 and the low-pressure circuit 20. The diffuser 30 may be placed at the outlet for the valve body assembly 14, such that it selectively receives pressurized fluid from the valve body assembly 14.

The diffuser 30 has an inlet 32 and an outlet 34. The inlet 32 has a first cross-sectional area and receives transmission fluid from the high-pressure circuit 18. The outlet 34 has a second cross-sectional area, which is larger than the first cross-sectional area, and expels transmission fluid to the low-pressure circuit 20.

Generally, the first pressure of the high-pressure circuit 18 refers to the pressure supplied by fluid at, or very near, the inlet 32 to the diffuser 30. The diffuser 30 experiences a pressure differential between the high-pressure circuit 18 and the low-pressure circuit 20. The greatest pressure differentials may occur during exhaust events, in which one, or both, of the fluid circuits of the first clutch 22 and the second clutch 24 is emptied quickly. The diffuser 30 reduces the velocity of the transmission fluid flowing between the valve body assembly 14 and the transmission case 12. The velocity reduction may reduce noise caused by transmission fluid striking internal components of the transmission 10 or the transmission case 12.

Figure 2:
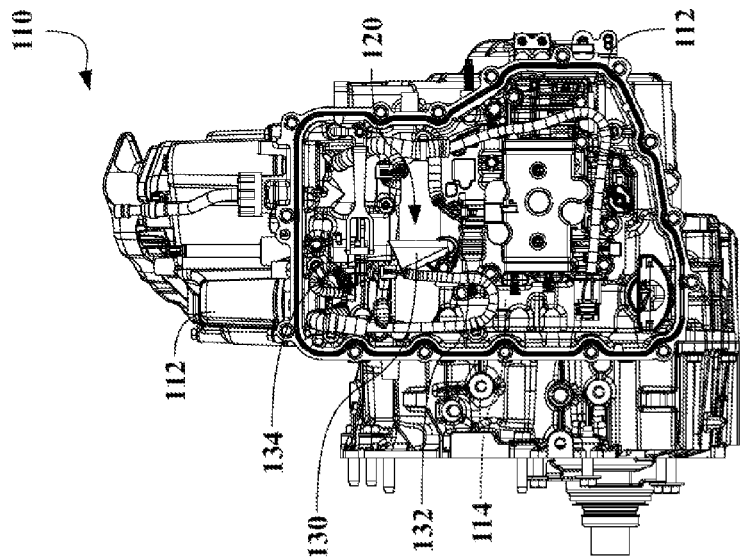
FIG. 2 is a schematic plan view of a transmission having a side cover removed to view a diffuser within a transmission case.

Referring now to FIG. 2, and with continued reference to FIG. 1, there is shown a schematic view of a transmission 110, which is illustrative of some of the structures shown diagrammatically in FIG. 1. The transmission 110 includes a transmission case 112 that generally surrounds and encloses other components of the transmission 110.

A valve body assembly 114 is largely hidden from view, but receives and distributes pressurized fluid from a pump (not shown). The transmission 110 also has a high-pressure circuit (hidden from view) within the valve body assembly 114 and a low-pressure circuit 120 within the remainder of the transmission case 112. The transmission case 112 is shown with a side cover portion removed to better illustrate interior components.

The transmission 110 includes a diffuser 130 disposed between the high-pressure circuit and the low-pressure circuit 120. During periods in which the valve body assembly 114 is exhausting automatic transmission fluid, the diffuser 130 transfers fluid between the high-pressure circuit and the low-pressure circuit 120. The diffuser 130 provides a space for the exhaust oil to decelerate and expand before entering the low-pressure circuit 120 of the transmission case 112. The diffuser 130 may therefore enhance the transition between high-velocity flow in the valve body assembly 114 to the much slower flow and lower pressures of the transmission case 112.

An inlet 132 of the diffuser 130 receives transmission fluid from the high-pressure circuit, and an outlet 134 of the diffuser 130 expels transmission fluid to the low-pressure circuit 120. The inlet 132 is largely hidden from view in FIG. 2. The inlet 132 has a first cross-sectional area, and the outlet 134 has a second cross-sectional area, which is larger than the first cross-sectional area. In the configuration shown in FIG. 2, the inlet 132 of the diffuser 130 is positioned above, relative to gravity, the highest fluid circuit for any fluid clutches (not shown) of the transmission 110.

Figure 3:
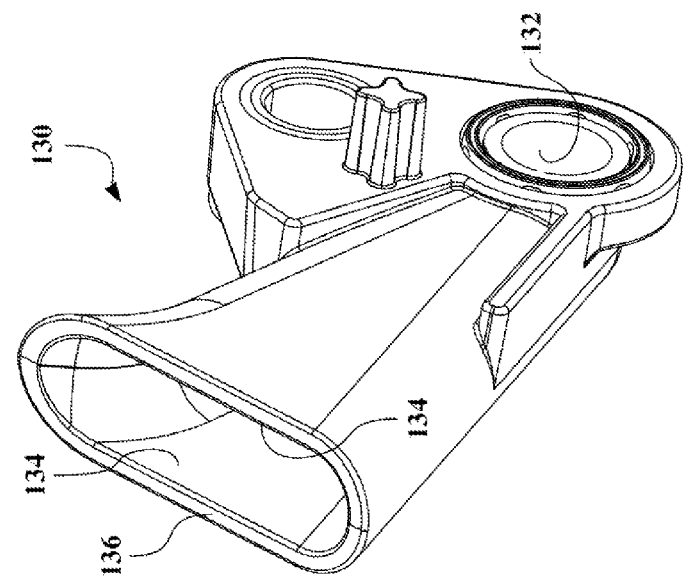
FIG. 3 is a schematic isometric view of an inlet region and an outlet region of the diffuser from FIG. 2.

Referring also to FIG. 3, and with continued reference to FIGS. 1-2, there is shown another view of the diffuser 130 shown in FIG. 2. FIG. 3 shows an isometric view of the diffuser 130, which is rotated relative to the view shown in FIG. 2, to better display the inlet 132 and the outlet 134.

The first cross-sectional area of the inlet 132 of the diffuser 130 is disposed at an angle of at least ninety degrees relative to the outlet 134 of the diffuser 130 and the second cross-sectional area. The outlet 134 is substantially perpendicular to the inlet 132. The cross-sectional areas may be taken as substantially-planar surfaces that could cover the inlet 132 and the outlet 134.

The diffuser 130 also includes an opposing wall 136 between the inlet 132 and the outlet 134 and partially forming the outlet 134. The opposing wall 136 is a planar structure substantially perpendicular to the direction of flow of transmission fluid through the inlet 132. Alternatively stated, the opposing wall 136 is substantially parallel to the first cross-sectional area of the inlet 132.

During exhaust events, in which one or more clutches is emptied of transmission fluid, a pressure ratio between the high-pressure circuit and the low-pressure circuit 120 is equal to or greater than one hundred. However, in some events, the pressure ratio may be up to five hundred.

Without the diffuser 130, high-velocity transmission fluid exiting the valve body assembly 114 may impact other components of the transmission 110 or the transmission case 112. However, the diffuser 130 reduces the velocity of the transmission fluid before it enters the, likely-ambient, low-pressure circuit 120 of the transmission case 112.

Varying the shape of the diffuser 130 and the relative sizes of the inlet 132 and the outlet 134 may effect velocity reduction achieved by the diffuser 130. The diffuser 130 may have a diffuser area ratio between the first cross-sectional area and the second cross-sectional area equal to or greater than four. In the configuration shown in FIGS. 2 and 3, the actual area ratio of the diffuser 130 is approximately 4.6. The diffuser 130 shown experiences between 75-85% reduction in the velocity of oil flowing between the inlet 132 and the outlet 134.

The diffuser 130 may be formed from nylon. Alternatively, the diffuser 130 may be formed from metals, plastics, or other suitable materials.

Figure 4:
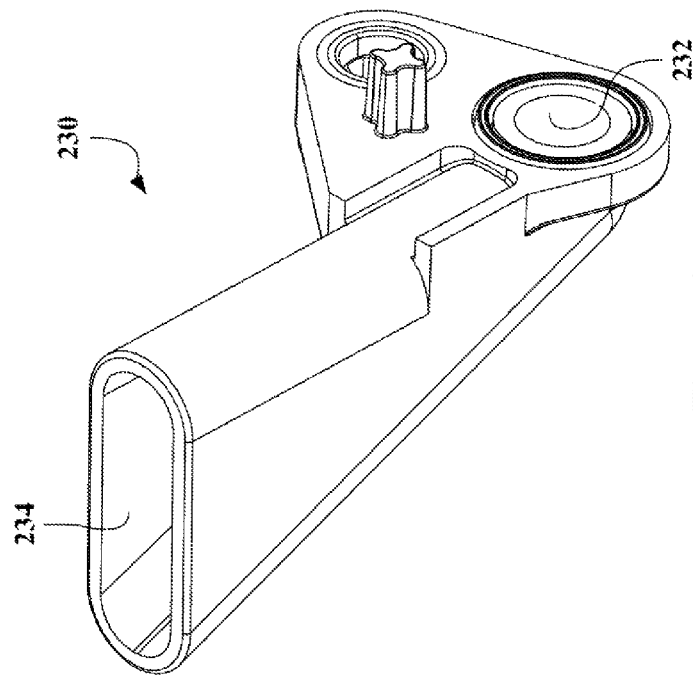
FIG. 4 is a schematic isometric view of an inlet region and an outlet region of an alternative diffuser.

Referring now to FIG. 4, and with continued reference to FIGS. 1-3, there is shown an isometric view of a diffuser 230. FIG. 4 shows the diffuser 230 from a similar viewpoint as the diffuser 130 shown in FIG. 3. The diffuser 230 may also be used with the transmission 110 shown in FIG. 2.

An inlet 232 of the diffuser 230 receives high-pressure fluid and an outlet 234 expels transmission fluid to a low-pressure region. The area ratio of the diffuser 230 shown in FIG. 4 is approximately 4.2.

A first cross-sectional area of the inlet 232 of the diffuser 230 is again disposed at an angle of approximately ninety degrees relative to a second cross-sectional area of the outlet 234 of the diffuser 230, such that the outlet 234 is perpendicular to the inlet 232. However, the diffuser 230 does not include a planar wall substantially perpendicular to the direction of flow of transmission fluid at the inlet 232.

Table 1, shown below, illustrates simulated testing results of the diffuser 130 and the diffuser 230. The testing utilized computational fluid dynamics software. The working fluid for the tests was an automatic transmission fluid (ATF), which may also be referred to as transmission oil, at a temperature of approximately thirty degrees Celsius. Two pressure differentials were applied to both the diffuser 130 and the diffuser 230.

TABLE 1

| | Diffuser 130 | | | Diffuser 230 | | |
| --- | --- | --- | --- | --- | --- | --- |
| pressure differential over diffuser [kPa] | flowrate [LPM] | velocity in; max/bulk [m/sec] | velocity out; max/bulk [m/sec] | flowrate [LPM] | velocity in; max/bulk [m/sec] | Velocity out; max/bulk [m/sec] |
| 100 | 42.6 | 13/11.18 | 6/2.41 | 32.1 | 10/8.41 | 12/2.00 |
| 500 | 92.8 | 30/24.31 | 13/5.24 | 72.4 | 22/20.97 | 29/4.51 |

As shown in Table 1, the diffuser 130 performed relatively better than the diffuser 230 at reducing the average velocity of the fluid passing through from high pressure to low pressure. The diffuser 130 performed better when the pressure differential was one hundred kilopascal (kPa) and also when the pressure differential was five hundred kPa. However, the results shown in Table 1 do not demonstrate that diffuser 230, or other diffuser configurations, could not be used to reduce the velocity of exhaust oil transmissions. Specific values and units used herein are illustrative only and do not limit the scope of the invention in any manner.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A transmission, comprising:
   a high-pressure circuit at least partially filled with transmission fluid at a first pressure;
   a low-pressure circuit at least partially filled with transmission fluid at a second pressure, lower than the first pressure; and
   a fluid clutch having a fluid circuit;
   a valve body in fluid communication with the fluid circuit and configured to actuate the fluid clutch, wherein the valve body is part of the high-pressure circuit; and
   a diffuser in fluid communication with the high-pressure circuit and the low-pressure circuit, wherein the diffuser has:
      an inlet having a first cross-sectional area and receiving transmission fluid from the high-pressure circuit, and
      an outlet having a second cross-sectional area, larger than the first cross-sectional area, and expelling transmission fluid to the low-pressure circuit.

2. The transmission of claim 1, wherein the first cross-sectional area of the diffuser is substantially perpendicular to the second cross-sectional area.

3. The transmission of claim 2, wherein a pressure differential between the high-pressure circuit and the low-pressure circuit is equal to or greater than one hundred kilopascal.

4. The transmission of claim 3, wherein the diffuser has a diffuser area ratio between the first cross-sectional area and the second cross-sectional area equal to or greater than four.

5. The transmission of claim 4, wherein the low-pressure circuit is substantially at ambient pressure.

6. The transmission of claim 5, wherein the inlet of the diffuser is positioned above, relative to gravity, the fluid circuit for the fluid clutch.

7. The transmission of claim 6, further comprising an electric machine, such that the transmission is a hybrid transmission.

8. The transmission of claim 7, wherein the diffuser is formed from nylon.

9. The transmission of claim 8, wherein the diffuser includes a planar wall that is substantially parallel to the first cross-sectional area of the inlet.

10. The transmission of claim 1, wherein the diffuser has a diffuser area ratio between the first cross-sectional area and the second cross-sectional area equal to or greater than four.

11. The transmission of claim 1, wherein the diffuser is formed from nylon.

12. The transmission of claim 1, wherein the diffuser includes a planar wall that is substantially parallel to the first cross-sectional area of the inlet.

13. The transmission of claim 12, wherein the diffuser is formed from nylon.

14. A transmission, comprising:
   a high-pressure circuit at least partially filled with transmission fluid at a first pressure;
   a low-pressure circuit at least partially filled with transmission fluid at a second pressure, lower than the first pressure; and
   a diffuser in fluid communication with the high-pressure circuit and the low-pressure circuit, wherein the diffuser has:
      an inlet having a first cross-sectional area and receiving transmission fluid from the high-pressure circuit, and
      an outlet having a second cross-sectional area, larger than the first cross-sectional area, and expelling transmission fluid to the low-pressure circuit, wherein the first cross-sectional area at the inlet is substantially perpendicular to the second cross-sectional area at the outlet.

15. The transmission of claim 14, wherein the diffuser has a diffuser area ratio between the first cross-sectional area and the second cross-sectional area equal to or greater than four.

16. The transmission of claim 15, wherein the diffuser includes a planar wall substantially parallel to, and adjacent to, the first cross-sectional area of the inlet, such that transmission fluid exiting the high-pressure circuit is substantially perpendicular to the planar wall.

17. The transmission of claim 16, wherein the diffuser is formed from nylon.

* * * * *